United States Patent
Falk et al.

(10) Patent No.: US 8,019,341 B2
(45) Date of Patent: Sep. 13, 2011

(54) METHOD FOR THE PROVISION OF DATA VIA A PILOT CHANNEL OF A RADIO COMMUNICATION SYSTEM

(75) Inventors: Rainer Falk, Eching (DE); Jijun Luo, Munich (DE); Eiman Bushra Mohyeldin, Munich (DE); Egon Schulz, Munich (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 584 days.

(21) Appl. No.: 11/822,158

(22) Filed: Jul. 2, 2007

(65) Prior Publication Data

US 2008/0020792 A1 Jan. 24, 2008

(30) Foreign Application Priority Data

Jun. 30, 2006 (EP) .................................. 06013609

(51) Int. Cl.
*H04W 4/00* (2009.01)
(52) U.S. Cl. ........... 455/434; 455/515; 455/68; 455/517
(58) Field of Classification Search .................. 455/517, 455/524, 509, 435.2, 552.1, 411, 528, 450, 455/435.1, 434, 420, 458, 515, 68, 69; 370/342
See application file for complete search history.

(56) References Cited

U.S. PATENT DOCUMENTS

| | | | | |
|---|---|---|---|---|
| 5,301,359 | A * | 4/1994 | Van den Heuvel et al. | 455/524 |
| 5,553,315 | A * | 9/1996 | Sobti et al. | 455/509 |
| 2002/0094817 | A1 * | 7/2002 | Rune et al. | 455/450 |
| 2004/0202146 | A1 * | 10/2004 | Lee | 370/350 |
| 2008/0200197 | A1 * | 8/2008 | Gessner et al. | 455/517 |
| 2008/0285526 | A1 * | 11/2008 | Gorokhov et al. | 370/338 |

FOREIGN PATENT DOCUMENTS

| | | |
|---|---|---|
| DE | 199 20 587 | 11/2000 |
| DE | 103 20 418 | 9/2004 |
| WO | WO 90/13211 | 11/1990 |

OTHER PUBLICATIONS

Paul Houzé et al., "Common Pilot Channel for network selection", Vehicular Technology Conference, May 8, 2006, pp. 67-71.
ETSI, "Global Pilot Mechanism", Tdoc SMG2 UMTS 52/97, ETSI STC SMG2 UMTS adhoc, Apr. 8-10, 1997, Lulea, Sweden, pp. 1-2.

* cited by examiner

*Primary Examiner* — John J Lee
(74) *Attorney, Agent, or Firm* — Staas & Halsey LLP

(57) ABSTRACT

A method provides first data via a pilot channel of a radio communication system with the pilot channel with the data transmitting information data on available access possibilities. To provide the first data, second data received from at least one terminal is used, with the second data referring to the access possibilities available for the at least one terminal.

23 Claims, 2 Drawing Sheets

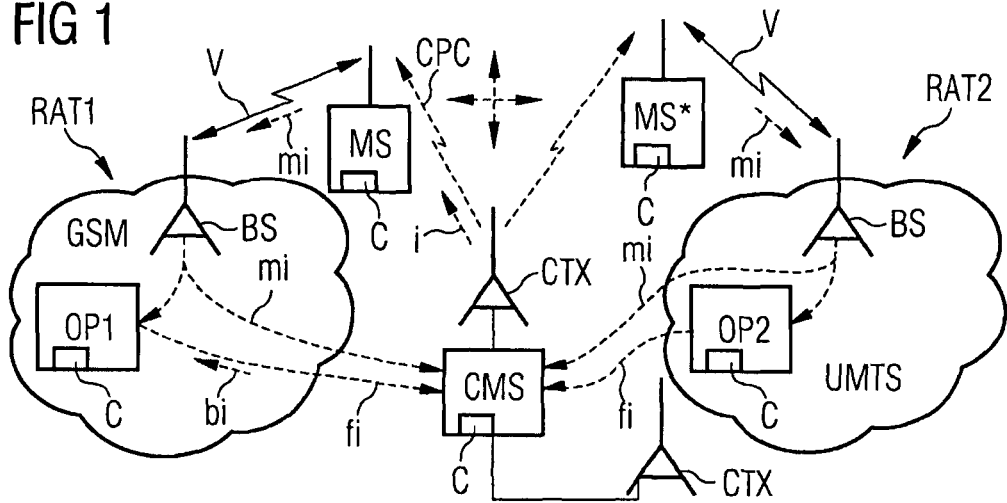
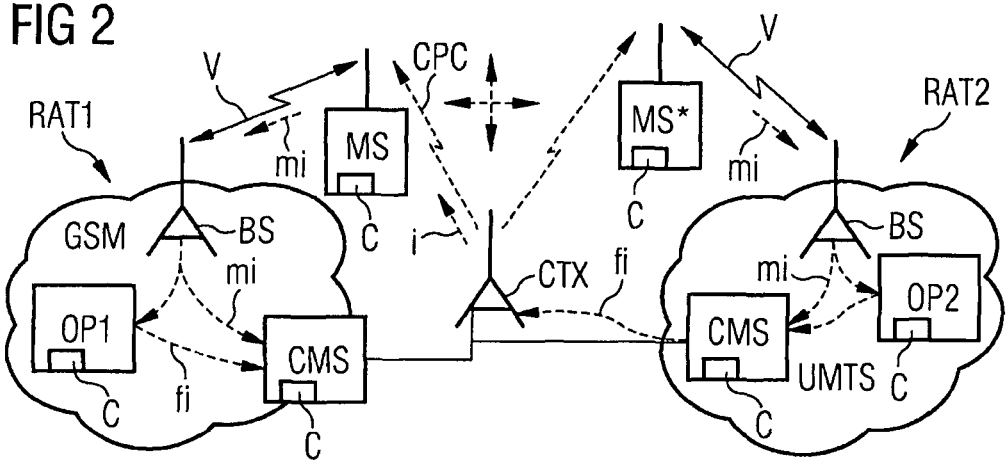

METHOD FOR THE PROVISION OF DATA VIA A PILOT CHANNEL OF A RADIO COMMUNICATION SYSTEM

CROSS REFERENCE TO RELATED APPLICATIONS

This application is based on and hereby claims priority to European Application No. EP06013609, filed Jun. 30, 2006, the contents of which are hereby incorporated by reference.

BACKGROUND

The method relates to a method for the provision of data via a pilot channel of a radio communication system, especially a mobile radio system, and also to components of such a radio communication system for implementing the method.

A steadily increasing number of different radio communication systems, by way of example only the systems according to the known standards GSM, IS-95, UMTS, CIMA2000, WLAN, WiMAX are mentioned, means that terminals as user terminals are supporting an ever greater number of these systems and/or standards. Because of this, a user using such a terminal is enabled to access communication networks in a variety of ways. Furthermore, operators of radio communication systems are increasingly providing systems with different standards to their customers, which offers the possibility of roaming between these different systems.

All this can, however, lead to the disadvantage that because of the large number of available systems, which also generally operate in different system-specific frequency bands or access physically different resources in another manner, the period for establishing a connection through a terminal is increased. If a user, for example, wants to use a high data rate service, e.g. video streaming, a service of this kind can potentially be provided by different systems. Provided no specific system was selected in advance by the user or his terminal, contact to various systems takes place by the terminal during the establishment of the connection. The terminal in this case preferably attempts to first receive signals from different systems, for example systems of the same operator, and then selects a system suitable for the selected service.

Especially if the terminal is brought into service at a location at which it previously had absolutely no connection to a system and therefore cannot make use of empirical values, for example if the user is using his terminal after flying to a foreign country, there is the added factor of not knowing with which local operator the home operator has made a roaming agreement to enable customers to have reduced connection charges, which creates difficulties or extends the access time. In this case, a local system or local operator is offered to the user several times with the user having to decide whether or not a connection should take place.

To clearly arrange the growing number of systems or access possibilities for users or their terminals, it was proposed in document "Global Pilot Mechanism, Tdoc SMG2 UMTS 52/97, ETSI STC SMG2 UMTS adhoc, 8.-10. April 1997, Lulea, Schweden, p. 1 and 2 amongst others, to introduce a unified global pilot channel (global pilot channel) on a unified frequency channel or unified frequency spectrum. Information on respective locally available radio access technologies (radio access technology indicator) and pointers (spectral pointers) to their spectral position is to be transmitted as access possibilities on a global pilot channel of this kind. Furthermore, a terminal can select a suitable, or supported, radio access technology as an access possibility for establishing a radio interface and also access same. Radio access technologies in this case, for example, mean systems with different standards, such as GSM and UMTS, which operate in different frequency bands. According to the aforementioned document, the transmission of the pilot channel should take place either by the operator himself, who would have to correspondingly also transmit information on competing operators, or else information on a national body, (not specified in more detail), for example a regulating body.

Such a pilot channel, which is also known as a cognitive pilot channel (CPC) or common pilot channel, is therefore a special radio-supported communication channel which announces information data as data on the available radio systems. A pilot channel of this kind is especially proposed for cognitive or reconfigurable radio interface devices, which, e.g. support concepts such as a flexible spectrum management or a dynamic spectrum allocation. Terminals with such reconfigurable radio interface devices are increasingly interesting from the point of view of the very large number of different radio communication systems which can change with respect to a spatially moving terminal, both over time as well as relative to the momentary location. In such cases, it would be impractical and time-consuming for a terminal to scan the radio spectrum for available access possibilities.

From $E^2R$-Project (see) http://e2r2.motlabs.com/), a concept with a cognitive/common pilot channel is known that announces information data regarding available radio systems. However, apart from the general basic concept of a cognitive pilot channel of this kind for announcing information data on available radio systems, and possibly also for providing configuration information or configuration software for enabling the configuration of a reconfigurable radio interface device, no detailed information is given.

From the former European Patent Application EP 05027892.8, a concept with a 3-stage cognitive pilot channel is known which is focused on how the operator organizes a common pilot channel in order to show the use of a spectrum with respect to various radio access technologies, especially of any operators, as access possibilities. However, the given possibilities are also limited.

From DE 199 20 587 C2, a non-generic construction and a continuous updating of a radio field database by measured data, which is recorded during a communication phase, is known, with the mobile station as a terminal being linked to available measured data and this information being linked to locating information and this information then being passed to a suitable interface in a network element belonging to the fixed network infrastructure and being evaluated. Such measured data processed by the radio network infrastructure is held ready by same to be called up, in order to enable a mobile terminal outside of communication phases to also be located. However, no reference to pilot channels can be seen in this case.

SUMMARY

One possible object of the invention is to provide a method for the provision of data via a pilot channel of a radio communication system and a terminal and a network-end network device for performing or supporting a method of this kind, which enables data on the pilot channel adapted to actual conditions, to be provided simply and quickly.

Accordingly, a method for providing first data via a pilot channel of a radio communication system, with the pilot channel transmitting, with a first data, information data relating to available access possibilities for terminals that may be in the reception area, to establish a connection via a radio interface, from a plurality of different access possibilities that are accessible for such terminals. In this case, it is advantageous if second data received from at least one such terminal is used at the network end to prepare the first data, with the received second data referring to access possibilities available to the terminal. In this way, data of a pilot channel can thus be adapted to actual circumstances with respect to region and time by the support of terminals. The various access possibilities are particularly offered by various access technologies.

The terminal preferably carries out measurements with respect to the availability of access possibilities measurable by the terminal and sends the measurement results as such through the network-end network device to receiving second data. In this way, it is advantageously enabled for access possibilities to resources in the pilot channel which would otherwise possibly not be available to one of the network operators providing the pilot channel to be taken into account. Furthermore, resources available from the point of view of the network operator, which in reality are, however, not available or not sufficiently available to the terminal, to be determined in this way and taken into account by suitable annotations or deletions in the succeeding first data sent via the pilot channel.

The terminal furthermore preferably carries out measurements for the access possibilities communicated by the pilot channel by previous recipients of the first data and sends the measurement results as such through the network-end network device to recipients of the second data. By measurements by terminals, the reception of first data sent via the pilot channel can thus be continuously adjusted to the actual reception conditions at the respective positions of the terminals. After a message from a terminal to the network-end network device, the first data on the pilot channel can be corrected, if necessary, for future transmissions via the pilot channel.

Advantageously, at least part of the first data can be prepared as encoded data for transmission via the pilot channel for decodable reception by one or more specified terminals. For example, in this way a network operator can arrange for only those terminals registered with him to be in a position to be able to receive transmitted first data referring to access possibilities on one or more of the resources provided by him.

Preferably, at least part of the first data is prepared as certified data for transmission via the pilot channel. In this way, the first data received by a terminal via the pilot channel is prepared as if from a quite specific data provider and thus detectable as reliable data.

Advantageously, at least part of the first data can be prepared as filtered data for transmission via the pilot channel. This enables a network operator who has provided information to the operator of a pilot channel, or also the operator of a pilot channel himself, to filter out specific information content or to allow only specific information content to pass through, so that, for example, only checked or reliable data is sent via the pilot channel.

With the received second data, terminal identification information and/or user information and/or that type of terminal information and/or user identification information in conjunction with the received data is advantageously received, with the terminal identification information and/or the user identification information, together with received second data and/or assigned charging information relative to the terminal identification information and/or user identification information being processed and/or stored at the network end.

The processing can advantageously be used to initiate billing as a credit or charge to an account assigned to one of the terminals.

A terminal with a radio interface device for establishing a radio interface to an access device of a radio communication system at the network end is of itself advantageous, with the radio interface device being designed to configure itself for the establishment of a connection via the radio interface depending on an available access possibility from a plurality of different access possibilities accessible for such a terminal, with a control device, integrated into the terminal, carrying out measurements of the access possibilities available to the terminal and transmitting the data thus acquired to a network-end network device, via an established radio interface, for processing the provision of first data for the pilot channels.

For reconfiguration, a terminal of this kind preferably uses first data received via a pilot channel which can be kept current even by the terminal itself or by a different terminal previously already active in the reception area.

Advantageous of itself is a network-end network device of a radio communication system with a control device for receiving, from a terminal connected to a radio interface, measured data as received second data and for preparing first data for transmission via a pilot channel of the radio communication system, with information data being transmitted for any terminals in the reception area regarding access possibilities for establishing a connection via a radio interface available from a plurality of different access possibilities of different radio access technologies that can be accessed by such terminals being transmitted with the first data, and with the network device updating the data on the basis of the second data measured by the at least one terminal and received by the network device. Information on various operators is preferably also transmitted with the information data on the available access possibilities.

Such a method, such a terminal or such a network-end network device can be particularly advantageously used if the first data regarding the access possibilities and/or the received second data relates to physical access parameters for at least one radio communication system. Current physical access parameters as access possibilities in the form of e.g. available frequencies, available time slots or available encoding systems or slipping systems, can thus be transmitted via the pilot channel.

Such a method, such a terminal or such a network-end network device can be particularly advantageously used if the data on the access possibilities and/or the received data on current logic access parameters is related to at least one radio communication system. Operator information can be easily transmitted in this way so that it is possible by the pilot channel to determine with respect to a terminal whether the preferred operator for that terminal is currently providing the resources for establishing a radio interface. Logic access parameters are e.g. also information on any services made available by an operator or access.

Such a method, such a terminal and/or such a network-end network device can be used with particularly advantage if these are designed for reconfiguring a reconfigurable radio interface in one such terminal for establishing a connection with respect to a radio access technology that can be selected as available by the terminal from such available access possibilities.

A management system for a cognitive or common pilot channel for handling or preparing information which is transmitted via a suitable pilot channel is particularly preferred. The basic system in this case particularly contains a pilot channel management station, at least one pilot channel transmission station, at least one base station of a communication system and at least one terminal of the radio communication device with a reconfigurable radio interface device.

For example, for providing a pilot channel of this kind with which the availability of a radio network is defined by the actual location or area, a method is advantageously provided which provides position-related measurements for the collection of information by terminals. Information collected by a terminal is specially processed by the pilot channel management station and transmitted via the at least one pilot channel transmission station by the pilot channel to terminals in the reception area of the pilot channel. The information transmitted in the pilot channel describes the communication systems that are offered by available base stations and also the type of radio communication or configuration which can be used by the base station. The information received via the pilot channel is received by terminals and used in order to select a radio access technology and to configure it, corresponding to the configurable radio interface device of the terminal, to the required radio access technology which was received by the announced pilot channel information.

The information transmitted by the pilot channel can in a variety of ways include both physical and logic information. In particular, the information can contain details of frequencies, locations, times and/or timepoints or descriptions of radio access technologies, for example with respect to modulation, frequency or power. In addition to the data values to be used, the information can also, for example, include values that deviate from the basic standard values. As an option, reconfigurable software and a configuration description can be transmitted via such a pilot channel as information in a wider sense.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows schematic components of radio communication systems and components for preparation and transmission of a pilot channel.

FIG. 2 shows an arrangement modified with respect to FIG. 1

DETAILED DESCRIPTION OF THE PREFERRED EMBODIMENTS

Figure 3:
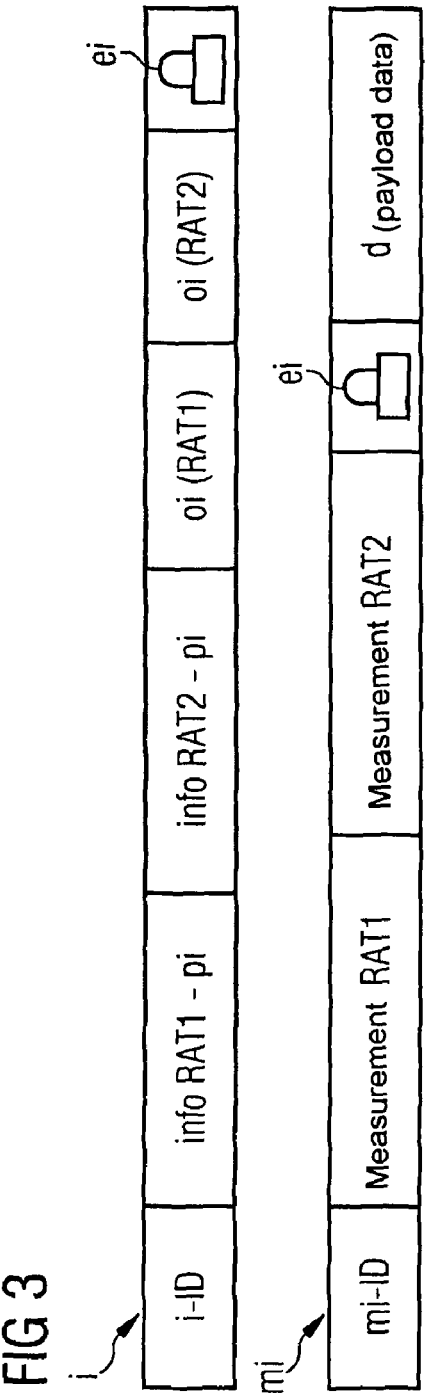
FIG. 3 shows schematic information blocks which are transmitted as pilot channel information and/or transmitted in the direction of a pilot channel management station as measuring information from terminals

Reference will now be made in detail to the preferred embodiments of the present invention, examples of which are illustrated in the accompanying drawings, wherein like reference numerals refer to like elements throughout.

FIG. 1 shows an arrangement of two different types of radio network that are operated according to different standards, e.g. GSM or UMTS. From the point of view of terminals MS, MS*, which have a particularly reconfigurable radio interface device and are able to communicate specially as an option via either such radio communication systems GSM, UMTS of different standards, there are thus at least two possibilities for establishing a radio interface for a radio connection V. With the example shown, it is assumed that at least the first terminal MS shown is in the area of radio cells that are established by the relevant base station BS of both radio communication systems GSM, UMTS. It is therefore possible for the terminal MS to establish a corresponding radio connection V to optionally either the GSM or UMTS radio communication system of a first radio access technology RAT1 or a second radio access technology RAT2. This does not preclude the terminal MS from being able to access both radio communication systems GSM UMTS simultaneously in parallel at the same time, especially where there are two integrated radio interface devices.

In order to spare a terminal MS expensive scanning of the environment for available radio access technologies RAT1, RAT2, especially after its activation, a pilot channel CPC, as it is known, e.g. as a cognitive or common pilot channel, is transmitted from a pilot management station CMS via one or more pilot channel transmitting stations CTX.

Data i as pilot channel information is transmitted by the pilot channel CPC. This data i includes information on the radio access technologies RAT1, RAT2. The terminal MS accordingly attempts, at least after its activation, to receive corresponding data i of the pilot channel CPC and to thus, saving time compared with scanning the environment, quickly acquire information from a multiplicity of, theoretically more, radio access technologies regarding available radio access technologies RAT1, RAT2. Accordingly, the terminal MS, or its control device C, can select a radio access technology RAT1 suitable for the required radio connection V and establish the corresponding radio connection V to the corresponding base station BS of the desired radio communication system GSM. Preferably, the terminal MS also continuously monitors the pilot channel CPC after its activation in order to always be informed regarding the current available radio access technologies RAT1, RAT2 and be able to make a change as necessary.

To support the pilot channel management station CMS or its operator, the terminal MS takes measurements, especially during phases of inactivity of the terminal MS, to check the availability of the radio access technologies RAT1, RAT2 in the environment of the terminal MS. These measurements can be carried out as a kind of scanning. The terminal MS then prepares the measurement results as data mi to be received by the pilot channel management station CMS, with the pilot channel management station CMS being a network-end network device. This data mi to be received through the pilot channel management station CMS is forwarded by the terminal MS, preferably via the radio interface V and base station BS, according to a first option, directly to the pilot channel management station CMS. The pilot channel management station CMS can compare the received data mi, which contains information on the actual parameters of radio access technologies RAT1, RAT2, with the data currently present in the pilot channel management station CMS and carry out an update of the data i to be subsequently transmitted via the pilot channel CPC. By such a method, the terminal MS thus supports the pilot channel management station CMS in transmitting always-current and relevant information on available access possibilities in the form of available access technologies RAT1, RAT2.

In deviation from this very simple basic principle, various modifications can be implemented either individually or in combination.

According to a first modification, the terminal MS can itself compare the data i received via the pilot channel CPC with the it's own measured data and if necessary prepare only differential data for transmission to the pilot channel management station CMS. The pilot channel management station CMS therefore receives only received data mi which as a type of correction refers only to deviations in the transmitted data i with respect to the actual reception conditions present at the location of the terminal MS. A resource-wasteful transmission of the data not necessary for the correction is avoided.

In this case, it is particularly advantageous if there is a transmission of location information by the terminal MS, so that local conditions can be taken into account by the pilot channel management station CMS and, in the case of a known technical radio anomaly deviations, can also be ignored as appropriate.

According to a further modification, the base station BS transmits the data received from the terminal MS not directly to the pilot channel management station CMS but instead additionally or alternatively, to a processing device of the operator OP1, OP2 within the own radio communication system GSM or UTMS. By its corresponding network device or control device C integrated within same, the operator OP1 can analyze the data mi received from the terminal MS and process especially by filtering, it as necessary. Such processed and/or filtered data fi is then forwarded from the processing device of the operator OP1, OP2 to the pilot channel management station CMS. In this way, the operator OP1, OP2 can ensure that with regard to access possibilities to resources of his radio communication system or his radio access technologies RAT1, RAT2, only specific information required by him is processed by the pilot channel management station CMS in its control device C and transmitted as information in the data i via the pilot channel CPC.

For example, the operator OP1, OP2, can thus ensure that although the terminal MS measures and forwards a specific access possibility on the radio communication system CMS, the pilot channel management system CMS does not learn of this information regarding the specific measured access possibility or receives it with a blocking annotation. Accordingly, no reference is made in the data i of the pilot channel CPC to this special access possibility and the terminals MS,MS* using the pilot channel CPC therefore do not obtain knowledge of this special access possibility.

According to a further exemplary modification, the terminal MS could carry out only a targeted measurement of the resources of the radio access technologies RAT1, RAT2, communicated by the data i of the pilot channel CPC and check their availability.

FIG. 2 shows a modified arrangement with several pilot channel management stations CMS being provided instead of a single pilot channel management station CMS. For example, an own such pilot management station CMS is assigned to each of the radio communication systems GMS, UMTS. These provide corresponding data for the pilot channel CPC and transmit such data to the pilot channel transmitting station CTX. From the data received in this way, this pilot channel transmitting channel CTX prepares suitable data i for transmission via the pilot channel CPC, with it being possible to optionally assign an own control and processing device to the pilot channel transmitting station CTX.

The top part of FIG. 3 shows examples of data blocks as data i which is transmitted via the pilot channel CPC and the bottom part of FIG. 3 shows the data mi received by the pilot channel management station CMS which is measured by a terminal MS, MS* and transmitted directly or indirectly to the pilot channel management station. For example, an introductory pilot channel identification information i-ID is sent as data i on the pilot channel CPC to initiate a data block. Subsequently, physical information or physical access parameters pi are transmitted in successive blocks for the different radio access technologies RAT1, RAT2 in each case. After transmission of physical access parameters pi, logic access parameters oi for the various radio access technologies RAT1, RAT2 can also be transmitted in other blocks. Alternatively, of course both the physical and also the logic access parameters pi, oi of one of the radio access technologies RAT1, RAT2 in each case can be sent in one block and the corresponding physical and logic access parameters pi, oi of further radio access technologies RAT1, RAT2 can be transmitted in other blocks. Other combinations of the information to be transmitted within the data i can, of course, be chosen.

The transmission of encoded data ei by the data i via the pilot channel CPC is particularly advantageous. By encoded information of this kind, special access parameters with regard to access possibilities can be transmitted, which are not utilizable by the generality of the terminals MS, MS* but instead only by special terminals MS which have a suitable key for decoding such encoded data ei. An operator OP1 of a radio communication system GSM can thus release specific access possibilities for only quite special terminals MS selected and authorized by him.

In addition to the transmission data ei encoded in this way, there is also advantageously the possibility of transmitting certified data so that a terminal MS receiving such certified data can check the authenticity of the data i.

The data mi to be received from the pilot channel management system CMS can also contain a variety of information. In particular, a terminal identification information mi-ID is transmitted for identification of the data source of this received data mi. In a case where data mi is not forwarded directly but indirectly via such a processing device, processing device identification information is transmitted if necessary, either additionally or as an alternative. Such terminal identification information mi-ID offers the particular advantage that the pilot channel management station CMS or a device or entity can uniquely assign received data mi to a specific terminal MS and/or to a specific processing device of a specific operator OP1.

In this way, targeted processing of received data mi and of the information contained therein can be undertaken by the pilot channel management station CMS. In addition to the possibility of an exclusion in the case of a receipt of an unauthorized terminal or one seen to be unreliable, there is especially also the possibility of specific data processing. Such specific data processing can, for example, include the taking account of, or exclusion, of special or selected access possibilities in the measurement results transmitted in the received data mi.

The transmission of billing information bi (FIG. 1) from the pilot channel management station CMS or a device connected to same to a billing centre in order to enable a monetary value credit note or similar entry to be made in an account of the user of the terminal MS or of the terminal MS itself. This could be an incentive to the user of terminals MS to place their terminal MS available for a process of this kind.

Therefore, a pilot channel management system is described which offers various contributions to the management of a pilot channel CPC. The fundamental basic system therefore preferably contains the pilot channel management station CMS, which can also be taken to contain only one control device within a computer of a device of a mobile radio communication system, and also at least one pilot channel transmitting station, at least one base station of a radio communication system and at least one terminal MS with a reconfigurable radio interface device. Instead of a pilot channel transmitting station, a base station of an existing radio communication system can, naturally, also be used. The terminal configures its radio interface device corresponding to a selected available access possibility from a multiplicity of actual or theoretical access possibilities, which perhaps are being, or could be, transmitted via the pilot channel CPC. The terminal MS independently carries out the measurements in order to obtain additional information, independent of the information contained in the data i via the pilot channel CPC, regarding access possibilities on radio access technologies and/or to check the access possibilities transmitted by the information in the data i. By transmitting such measured data from the terminal MS directly or indirectly to the pilot channel management station CMS, the pilot channel management station CMS obtains received data mi which serves to update the data of the data i to be subsequently transmitted via the pilot channel CPC.

A pilot channel management system of this kind can advantageously be used in combination with a variety of existing or future management methods. In the case, for example, of a three-stage hierarchical pilot channel subdivided into a country-level pilot channel, an operator-level pilot channel and an access technology broadcast pilot channel, the pilot management system CMS can particularly be operated by information on the operator level.

It is also possible to operate the pilot channel management system through an independent pilot channel operator, who collects and prepares information independent of network operators, For example, for this purpose an application service provider can collect information on networks which can be delivered to their respective subscribed users. If the information is collected from mobile users and/or through their terminals, it is not necessary to link in network operators. It is also possible to use information provided via users or their terminals to improve information sent by network operators. In particular, empirical values from users or their terminals can be utilized, with the users being able to also carry out an assessment, for example by manually input additional information or by transmitting the data measured by them to special access numbers of the pilot channel management system CMS. In this way, empirical values of the user with respect to the reliability of certain access possibilities or radio access technologies RAT1, RAT2 can be included in the processing for the provision of the data i to be transmitted via the pilot channel CPC.

Advantageously, a pilot channel management station CMS can be in particular be operated on the basis of two preferred contracts. In this way, contracts can be appropriately drawn up with network operators and/or with users, i.e. operators of terminals MS, MS*. Special information such as billing information bi can, for example, be processed and/or provided. In particular, depending on the contract, the data i to be sent via the pilot channel CPC can be specially processed, for example by individual filtering processes which run in a control device C of one of the components. An agreement with operators defines which information is transmitted over the pilot channel CPC with respect to the networks of the operator, and also, if necessary, whether a payment to the pilot channel operator is to take place. Agreements with users define which information is to be transmitted via the pilot channel CPC as part of the data i of certain users or their terminals MS. In particular, by encoding, terminals MS* not thus authorized can be excluded from receiving or evaluating special information content of the data i. In this way, charge-free basic information can, for example, be transmitted via the pilot channel CPC, with premium information, with, for example a higher accuracy or a greater information content, such as billing information, can be provided only for paying users or terminals MS.

The provision of pilot channel information by home operators using information which is provided by their subscribed users is also possible as an implementation model. A home network operator does not offer a global view but instead as an operator offers only information to the users or terminals subscribed to him. With an implementation of this kind, cooperation with a visited network operator for the provision of information is not necessary.

It is particularly advantageous if a pilot channel information in the form of data i can be transmitted not only via transmitting stations already integrated into radio communication systems but also via a separate pilot channel radio system. In principle, it is possible to use different access technologies for the transmission of the pilot channel using available network access technologies so that pilot channel information can, for example, be obtained by hard-wired networks by downloading from an http server, i.e. via a device connected to the Internet, and stored in the terminal. This latter case can be particularly relevant if any connectivity to the internet already exists or has existed in the recent past.

From such information, users or their terminals can determine which communication systems are available even though a separate pilot channel system is possibly not available at that moment. A deficient availability can specially exist if the user wishes to communicate with a terminal in a distant region, for example in a different country or in a different continent, with his terminal for example being outside the country of the radio system operated for a pilot channel. Therefore, in this way, an individual transmission is offered not only via a radio-supported pilot channel but also if necessary via a cable-supported pilot channel by transmission of the data i via an Internet connection. In this case in particular, access can also be made to a specific access number via a radio interface which enables access to the Internet and therefore to the pilot channel management system.

In this way, home network operators can in particular advantageously use information which is transmitted by users who have previously visited other networks. In such a case, the data measured by the terminal is received delayed at a later timepoint as received data mi through the pilot channel management station. It is also possible for a terminal which visits a foreign network to send confirmation reports to his home network operator by a software agent in the terminal, in order to thus transmit corresponding measured data.

A multiplicity of different information, such as indicating an existing user network, services used, e.g. VOiIP(Voice Over Internet Protocol) or Internet accesses, additional information such as time, location, network monitoring information and also quality parameters can be transmitted. Quality parameters can, for example, be used to show whether available resources offer adequate quality, but detailed information such as packet loss rate, signal strength, bit error rate etc. can also be transmitted. The home network operator compiles this information, which can have been supplied preferably by a plurality of users, especially his subscribers or their terminals, and makes the information available, preferably in compiled form, as a basis for a network selection and/or a handover.

Figure 4:
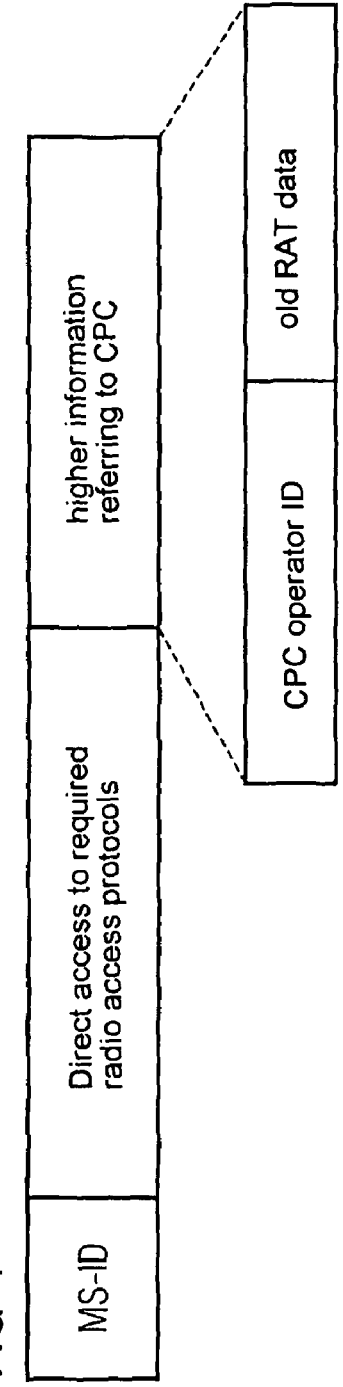
FIG. 4 shows a further schematic representation of prepared and transmitted data

For example, according to FIG. 4, terminal operator identification information MS-ID can be transmitted with the data followed, by a direct access to required radio access protocols and with higher information referring to the pilot channel CPC then being transmitted. The latter in turn can especially include operator identification information relative to the pilot channel CPC and old radio access technology data, which is taken into account when matching.

Accordingly, an open system for efficient management of pilot channel information including preferably also a payment management procedure and a certification process for the delivery of pilot channel contexts, that are delivered synchronously or almost synchronously, is provided. The enabling of a self-organizing and/or self-updating pilot channel information based on reports sent by terminals is also advantageous. Particularly advantageous is the possibility of filtering and/or prioritizing of the information content of data transmitted on the pilot channel CPC.

Particularly advantageous also is the possibility of compensation for the operator of the pilot channel CPC if the information transmitted via the pilot channel CPC is used by a user to select a specific network. It thus advantageously not only enables radio network operators who operate a radio access technology with access possibilities to transmit information on this to a pilot channel management station which validates such information, but particularly also the combination of information from various sources including terminals is possible.

Particularly advantageous is the certification of the operator of the pilot channel. By a certified transmission of data i via the pilot channel CPC, a terminal MS, MS* receiving such data i can, after suitable checking with a corresponding check code in its control device, check the authenticity of the sender and decide with appropriate confidence whether to establish a connection or to change a connection. Accordingly, certification of the data i can be performed by the pilot channel management station CMS by a digital certificate. The unchanged forwarding of certified data which the pilot channel management station CMS has received from a network device of an operator OP1 of one of the radio access networks GSM is in principle possible and advantageous. It can be advantageously ensured by certification management that only those operators are issued with a certificate that are registered to deliver pilot channel content as qualified operators with regard to reliability and/or punctuality. In addition to determining the identity of a pilot channel operator, a certificate can also certify additional information specified with respect to the data quality delivered via the pilot channel CPC. A certification can, for example, take place through a test channel monitoring institution, which certifies that the pilot channel operator offers the necessary acceptance with respect to his data quality.

Certification can also include service qualities or service properties, for example an assured and checked reaction time, i.e. for example the maximum delay after which new updated information is available after a change to an access technology configuration. Which types of radio access technologies are announced by the pilot channel can also be certified. Thus, for example, a specific pilot channel operator can supply only information on commercial radio-supported systems but not on public, secure and professional radio systems. Furthermore, regional information can be certified, which is offered via the pilot channel. A certificate can also be used to certify which kind of information is offered, for example whether only basic data is offered or whether further information such as network utilization, information on charging or roaming agreements is provided. Such information enables the control device C of the terminal MS to check the confidentiality of the supplied information by carrying out a key check or certificate check and dealing with the received information accordingly.

Such a public key, which is certified by the certificate, can be used directly by the operator of the pilot channel CPC in order to digitally sign the information communicated in this way. Naturally, other presently known or future security technologies for broadcast/multipath propagation systems can be used, for example as 3GPP MBMS security.

Operators of a pilot channel CPC can advantageously monitor the behavior of a terminal or of its user. If, for example, in the case of the situation according to FIG. 1 the terminal MS sends his operator OP operator identification information of the pilot channel CPC and there is a false reconfiguration of the terminal MS on the basis of false information on the pilot channel CPC, the operator OP1 can then identify this fault. Countermeasures can, for example, be a reduction in charging or a withdrawal of the certificate.

Advantageous of itself is also a self-organization and/or updating of the pilot channel, as described with reference to FIGS. 1 and 2. In the context of a modification or addition to the described process, it can be provided that the pilot channel management station CMS also sends additional information as a type of meta information via the data i, which describes which type of content the transmitted information should have. If a terminal MS detects that a radio access technology or access possibility deviates from the data i of the pilot channel CPC, it can also determine on the basis of the meta information that this radio access technology is not taken into account by the pilot channel CPC and therefore it is not necessary to report the deviation to the pilot channel management station CMS. Such filtering mechanisms can advantageously be implemented stepwise in an iterative manner.

To perform the various described procedures, different components within such radio communication systems, or also independent devices, can be fitted with control devices C to perform such procedures. Advantageously, the pilot channel management station CMS has two specific functions, information filtering and information prioritizing. Naturally, such functions can additionally or alternatively also be provided at the network end in processing devices of different radio communication systems.

As part of the information filtering, the pilot channel management station CMS determines available radio systems, particularly with a view to a complete information content and subsequently reduces the information so that a terminal MS can begin communication via at least one access possibility with at least one network access technology RAT1. For this purpose it requires a virtual reference model of the relevant terminal and, if necessary, of its subscription data. In this case it is advantageous if no complete information is to be transmitted via the pilot channel CPC. Only such information content as is absolutely necessary for starting a basic or initial communication can be transmitted in a first step. More detailed information can then be transmitted via regular communication, so that complete information with a very large information content does not necessarily have to be transmitted via the pilot channel CPC.

Advantageously, information prioritizing also takes place on the pilot channel CPC or in the data i transmitted in it. The information prioritizing is carried out in a particularly efficient manner in that data with a higher priority, i.e. data packets with, for example, a higher-value priority index, is more often repeatedly transmitted than data packets with a lower priority index. A priority can be specified using various criteria. In particular, the priority can be based on a contract or on a payment by a radio system provider. Thus, information with respect to an access possibility to resources of a network operator who has paid more or has a higher priority is transmitted more often than corresponding information of a different network operator. Basic services and data can also be given a higher priority compared to services and data less important for initial access. If services are prioritized, services which enable an early communication can be given a high priority. Specific information which is necessary only for a small number of terminals MS, MS* and therefore is to be sent less often or less frequently can on the other hand be provided with a lower priority. An interaction level between radio systems which is used by terminals or their users can also be given a high priority compared with systems and resources for a machine communication. In contrast to a machine, a human user will not be prepared to wait as long for a connection. If the user or terminal is part of an automated sales service, a lower prioritizing is on the other hand possible for a different machine for this purpose than in the case of an emergency device. As part of the prioritizing, indices can be set so that resources or access possibilities of radio access technologies with free resources are announced more often via the pilot channel CPC than access possibilities already utilized to a high degree.

Advantageously, the terminals communicate their user or subscriber information directly to the pilot channel management station CMS, with it being possible to use simple logic connections for this purpose.

According to a preferred embodiment, billing can also be prepared by the generation and transmission of billing information bi. Billing information bi in this case can be used for a variety of applications and a variety of billing methods.

If according to a first variant a user or his terminal MS uses offered pilot channel information, this fact is preferably indicated to the operator or provider of the pilot channel CPC, so that the operator or provider can finally instigate automated billing by his control device C. If a user or his terminal MS selects a specific network on the basis of such pilot channel information, the operator of the pilot channel CPC can preferably automatically demand a fee from the operator of the selected network. This is comparable with the non-generic clicking of advertising on an Internet page, where the operator of the page is credited with a payment for each click.

Particularly advantageous is a variant where the users and terminals MS are also automatically given a payment. This is advantageous because in this way users can be motivated to use their terminals MS, MS' to implement instructions given by the pilot channel CPC, in order finally to preferably check the entire radio environment for the operator of the pilot channel CPC or his pilot channel management station CMS for access possibilities. In this way, faults or unmatched radio accesses can be avoided. This can also increase the system capacity.

Particularly advantageous is an embodiment where additional information content is announced via the pilot channel CPC as part of the data i. Examples of such information are information on the operator, existing roaming agreements, charges, offered services, offered service qualities or performance capabilities, utilizations or loads. Accordingly, the pilot channel CPC transmits not only information on available radio access technologies RAT1, RAT2 but also information which is advantageous for the user and/or his terminal MS, MS* when deciding which technology should be used.

The various embodiments and variations that can be implemented individually or in combination with each other offer a plurality of advantages. By pilot channel management stations CMS managed using information from the terminals MS, MS*, information content which is always current and filtered or processed as required can be transmitted for the efficient utilization of resources and to reduce excessive signaling.

A system of this kind is also flexible. New users who are subscribers to an operator can use the structure of the pilot channel management station CMS in conjunction with their pilot channel transmitting station CTX for efficient pilot channel access/information dissemination. In the self-organized pilot channel CPC, information is shown if a user has reported a fact to the pilot channel management station CMS, with possibly complicated contract conditions between the network operators and an operator of the pilot channel CPC being unnecessary.

If the self-organizing property of a pilot channel CPC of this type is utilized, differences between the conditions communicated via the pilot channel CPC and actual conditions of access possibilities to radio access technologies RAT1, RAT2 with terminals MS, MS* in between are reported and the data i transmitted via the pilot channel CPC can be updated with only a slight time offset.

In addition to the use of mobile radio systems such as the two examples, GSM and UMTS, shown, other types of radio access technologies can be linked into such a system, for example radio networks or radio-network supported Internet accesses.

Various types of terminals can also be used as terminals MS, MS*. In particular, the measurement of available resources of different types of radio access technologies RAT1, RAT2 can also be performed and reported by terminals that have no reconfigurable radio interface or two or more independent radio interfaces for access to network accesses of various radio access technologies. Furthermore, to support the method, such terminals MS, MS* need not necessarily be able to monitor all of the theoretically available radio access technologies but instead perhaps be able to only monitor single or even just one single available access technology.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for providing first data to a plurality of radio communication terminals via a pilot channel of a radio communication system, comprising:
    receiving second data from at least one radio communication terminal, the second data identifying the access possibilities of the radio communication terminal sending second data;
    using the second data to prepare the first data, the first data identifying the available access possibilities of the radio communication system; and
    transmitting the first data to the plurality of radio communication terminals on the pilot channel,
    wherein a radio communication terminal selects an access method based on the first data, reconfigures a reconfigurable radio interface device to establish a connection in accordance with the access method, and requests a service after receiving the first data and selecting the access method.

2. The method as claimed in claim 1, wherein the at least one radio communication terminal:
    performs measurements with respect to the available access possibilities to thereby produce measurement results, and
    transmits the measurement results as the second data.

3. The method as claimed in claim 2, wherein the at least one radio communication terminal performs measurements of the access possibilities through signals contained in the first data.

4. The method as claimed in claim 1, wherein
    at least part of the first data is transmitted as encoded data, and the encoded data is decoded by the at least one radio communication terminal.

5. The method as claimed in claim 1, wherein at least part of the first data is certified data.

6. The method as claimed in claim 1, wherein at least part of the first data is filtered data.

7. The method as claimed in claim 1, wherein
the second data contains or is sent together with at least one of radio communication terminal identification information and user identification information,
billing information is assigned based on the at least one of terminal identification information and user identification information, and
the at least one of terminal identification information and user identification information is processed together with the second data and/or the billing information.

8. The method as claimed in claim 7, wherein
the billing information contains information regarding an account assigned to at the least one radio communication terminal, and
the processing causes the account to be billed or charged.

9. The method as claimed in claim 1, wherein
the second data contains or is sent together with at least one of terminal identification information and user identification information,
billing information is assigned based on the at least one of terminal identification information and user identification information, and
the at least one of terminal identification information and user identification information is processed and stored together with the second data and/or the billing information.

10. The method as claimed in one of claim 1, wherein
the first data and/or the second data are relative to physical access parameters for the radio communication system.

11. The method as claimed in one of claim 1, wherein
the first data and/or the second data are relative to a current logic access parameter of the radio communication system.

12. The method according to claim 1, wherein the first data is a reduced set of access possibilities for the radio communication system compared to the access possibilities of the radio communication terminal in the second data.

13. A radio communication terminal of a radio communication system, comprising:
a transmitter to transmit second data, the second data identifying the access possibilities of the terminal; and
an interface device to receive first data transmitted on a pilot channel, the first data identifying the available access possibilities of the radio communication system and configured to:
select an access method based on the first data, reconfigure the interface device to establish a connection in accordance with the access method, and request a service after receiving the first data and selecting the access method.

14. The terminal as claimed in claim 13, wherein the interface device reconfigures to establish a connection via a radio interface, depending on the available access possibilities of the radio communication system.

15. The terminal as claimed in claim 13, wherein
the terminal further comprises a control device to perform measurements of the available access possibilities of the terminal and produce access results, and
the access results are transmitted as the second data,
the first data is prepared based on the access results.

16. The terminal as claimed in claim 13, wherein the interface device is reconfigured relative to the first data.

17. The terminal as claimed in one of claim 13, wherein
the first data and/or the second data are relative to physical access parameters for the radio communication system.

18. The terminal as claimed in one of claim 13, wherein
the first data and/or the second data are relative to a current logic access parameter of the radio communication system.

19. The terminal as claimed in claim 13, wherein the first data is a reduced set of access possibilities for the radio communication system compared to the access possibilities of the radio communication terminal in the second data.

20. A network-end network device of a radio communication system, comprising:
a control device to perform an evaluation of second data received from at least one radio communication terminal with respect to access possibilities available for the at least one radio communication terminal; and
a transmitter to transmit first data to a plurality of radio communication terminals via a pilot channel, the first data identifying available access possibilities of the radio communication system, the available access possibilities of the radio communication system being determined depending on the evaluation of the second data,
wherein an access method based on the first data received by a radio communication terminal is selectable by the radio communication terminal, a radio interface device of the radio communication terminal is reconfigurable to establish a connection in accordance with the access method by the radio communication terminal, and a service is requestable by the radio communication terminal after the radio communication terminal receives the first data and selects the access method.

21. The network-end network device as claimed in claim 20, wherein
the first data and/or the second data are relative to physical access parameters for the radio communication system.

22. The network-end network device as claimed in claim 20, wherein
the first data and/or the second data are relative to a current logic access parameter of the radio communication system.

23. The network-end network device as claimed in claim 20, wherein the first data is a reduced set of access possibilities for the radio communication system compared to the access possibilities of the radio communication terminal in the second data.

* * * * *